US010305291B2

(12) United States Patent
Fintzos et al.

(10) Patent No.: US 10,305,291 B2
(45) Date of Patent: May 28, 2019

(54) VOLTAGE SOURCE CONVERTORS (71) Applicant: GENERAL ELECTRIC TECHNOLOGY GMBH, Baden (CH)

(72) Inventors: Georgios Fintzos, Attiki (GR); Robert Stephen Whitehouse, Stafford (GB); Carl David Barker, Walton Stone (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 74 days.

(21) Appl. No.: 15/307,566

(22) PCT Filed: Apr. 28, 2015

(86) PCT No.: PCT/EP2015/059146
§ 371 (c)(1),
(2) Date: Oct. 28, 2016

(87) PCT Pub. No.: WO2015/165876
PCT Pub. Date: Nov. 5, 2015

(65) Prior Publication Data
US 2017/0054301 A1  Feb. 23, 2017

(30) Foreign Application Priority Data

Apr. 29, 2014  (EP) .............................. 14275095

(51) Int. Cl.
*H02J 7/34* (2006.01)
*H02J 1/10* (2006.01)
(Continued)

(52) U.S. Cl.
CPC ................ *H02J 5/00* (2013.01); *H02J 3/382* (2013.01); *H02J 3/386* (2013.01); *H02M 5/40* (2013.01); *H02M 7/02* (2013.01); *H02P 9/102* (2013.01); *H02J 2003/365* (2013.01); *H02P 2101/15* (2015.01); *H02P 2201/01* (2013.01); *H02P 2201/03* (2013.01); *Y02E 10/763* (2013.01)

(58) Field of Classification Search
CPC .... H02J 5/00; H02J 3/386; H02J 3/382; H02J 2003/365; H02M 5/40; H02M 7/02; H02P 9/102; H02P 2101/15; H02P 2201/01; H02P 2201/03; Y02E 10/763
USPC ........................................................... 307/52
See application file for complete search history.

(56) References Cited

U.S. PATENT DOCUMENTS

2007/0121354 A1  5/2007  Jones et al.
2010/0157634 A1  6/2010  Yu et al.
(Continued)

FOREIGN PATENT DOCUMENTS

CN  101997312 A  3/2011
CN  102326310 A  1/2012
(Continued)

OTHER PUBLICATIONS

International Search Report and Written Opinion dated Jun. 3, 2015 which was issued in connection with PCT Patent Application No. PCT/EP2015/059146 which was filed on Apr. 28, 2015.
(Continued)

*Primary Examiner* — Richard Tan
(74) *Attorney, Agent, or Firm* — GE Global Patent Operation; Scott R. Stanley (57) ABSTRACT

A wind farm side voltage source converter comprises a DC terminal for connection to a DC transmission link, an AC terminal for connection to a wind farm that includes at least one wind turbine, and a main controller. The main controller is configured to modify an active power demand (Pdemand) of the voltage source converter which is received from a higher level controller by introducing an artificial inertia factor and/or in response to a measured DC voltage ($V_{dc\_msr}$) at the DC terminal.

12 Claims, 4 Drawing Sheets (51) Int. Cl.
    *H02J 3/38*     (2006.01)
    *H02J 5/00*     (2016.01)
    *H02P 9/10*     (2006.01)
    *H02M 5/40*     (2006.01)
    *H02M 7/02*     (2006.01)
    *H02J 3/36*     (2006.01)
    *H02P 101/15*     (2016.01)

(56) References Cited

U.S. PATENT DOCUMENTS

2013/0009611 A1* 1/2013 Tripathi .................. H02P 9/105
                                                                                                                 322/23
2013/0265809 A1* 10/2013 Gupta ..................... H02J 3/386
                                                                                                                 363/131

FOREIGN PATENT DOCUMENTS

| CN | 102511122 A | 6/2012 |
| CN | 102801176 A | 11/2012 |
| CN | 103138280 A | 6/2013 |
| EP | 2472710 A1 | 7/2012 |
| EP | 255007 A2 | 1/2013 |
| JP | H09163605 A | 6/1997 |

OTHER PUBLICATIONS

Machine translation and First Office action and Search issued in connection with corresponding CN Application No. 201580023520.7 dated Jul. 4, 2018.

* cited by examiner

VOLTAGE SOURCE CONVERTORS

TECHNICAL FIELD

Embodiments of the present invention relate to a wind farm side voltage source converter, an electrical system including such a converter, and a power transmission network having a plurality of parallel-connected wind farm side voltage source converters and/or a plurality of parallel-connected electrical systems including such a converter.

BACKGROUND

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometre of the lines and/or cables. Conversion from AC to DC thus becomes cost-effective when power needs to be transmitted over a long distance. It is also cost-effective when transmitting power under the sea, even for short distances, because the capacitance of undersea cables is much higher than that of overhead lines.

In such power transmission networks, converters are required at each interface between AC and DC systems to effect the required conversion, and one such form of converter is a voltage source converter. More particularly, when interconnecting one or more wind turbines, i.e. a wind farm, with a main AC grid the power transmission network may include a wind farm side voltage source converter which interfaces directly with the wind farm and a grid side voltage source converter that interfaces directly with the main AC grid. An overhead line or an under-sea cable, i.e. a DC transmission link, extends between the wind farm side and grid side voltage source converters.

Each of the wind farm side and grid side voltage source converters includes a plurality of series connected sub-modules that have at least one switching element which is connected in parallel with an energy storage device in the form of, e.g. a capacitor. The or each switching element may include a semiconductor device in the form of, e.g. an Insulated Gate Bipolar Transistor (IGBT), which is connected in anti-parallel with a diode although it is possible to use other semiconductor devices.

Switching of the or each switching element selectively directs current through the capacitor or causes current to bypass the capacitor such that each sub-module is selectively able to provide a voltage. In this manner it is possible to build up a combined voltage, via the insertion of the capacitors of multiple sub-modules (with each sub-module providing its own voltage), which is higher than the voltage available from each individual sub-module.

The sub-modules work together in this manner to provide a stepped variable voltage source. This permits the generation of an AC voltage waveform which enables the voltage source converter to provide the aforementioned power transfer functionality between a respective AC system, e.g. a wind farm or a main AC grid, and an associated DC system, e.g. a DC transmission link.

According to a first aspect of the invention there is provided a wind farm side voltage source converter comprising a DC terminal for connection to a DC transmission link; an AC terminal for connection to a wind farm including at least one wind turbine; and a main controller configured to modify an active power demand of the voltage source converter received from a higher level controller by introducing an artificial inertia factor and/or in response to a measured DC voltage at the DC terminal.

Modifying the active power demand of the voltage source converter by introducing an artificial inertia factor compensates for a lack of mechanical resistance in the or each wind turbine of the wind farm. This, in turn, helps to resolve instability issues in a main AC grid where the power output of the wind farm is evacuated which might otherwise be caused by operation of the voltage source converter. It also helps to smooth out variations in the frequency at which the voltage source operator operates.

Meanwhile, modifying the active power demand of the voltage source converter in response to a measured DC voltage at the DC terminal allows a DC transmission link which is, e.g. operatively associated in use with the wind farm side voltage source converter, to act as a communication medium. This in turn allows, e.g. a grid side voltage source converter connected to the other end of the DC transmission link, to control the active power output of the wind farm side voltage source converter without the need for a separate costly and unreliable telecommunication system between the wind farm side voltage source converter and, e.g. the grid side voltage source converter.

In an embodiment, the main controller includes a power-frequency slope sub-controller and the main controller is configured to modify the active power demand of the voltage source converter by passing the active power demand through the power-frequency slope sub-controller and thereafter applying an artificial inertia factor to the resulting frequency.

Such a step helps directly to prevent the resulting frequency, i.e. the frequency value output by the power-frequency slope sub-controller and the frequency at which the wind farm side voltage source converter is controlled to operate, from varying too erratically.

The power-frequency slope sub-controller may be configured itself to apply the artificial inertia factor.

Such a configuration can be readily implemented by minor alteration of the operating algorithms of the power-frequency slope sub-controller.

Optionally the artificial inertia factor takes the form of a lagging function.

A lagging function desirably effects the rate at which the frequency value output by the power-frequency slope sub-controller varies.

In an embodiment of the invention the main controller is configured to modify the active power demand of the voltage source converter received from a higher level controller in response to a measured DC voltage at the DC terminal by comparing the measured DC voltage with an expected DC voltage based on a DC voltage demand received from a higher level controller and altering the active power demand when the measured DC voltage differs from the expected DC voltage.

Having a main controller configured in the foregoing manner allows the main controller to vary the active power output by the wind farm side voltage source converter so that it is aligned with the active power demand of, e.g. a grid side voltage source converter which in use is connected with the wind farm side voltage source converter by a DC transmission link, such that, e.g. the grid side voltage source converter is able to act as a master converter while the wind farm side converter acts as a slave converter.

The altered active power demand may be passed through the power-frequency slope sub-controller before an artificial inertia factor is applied to the resulting frequency.

Such an arrangement allows for the implementation of a master-slave control relationship between the wind farm side voltage source converter and, e.g. a grid side voltage source converter, in a manner whereby the wind farm side voltage source converter remains stable and subject only to smooth variations in operating frequency.

According to a second aspect of the invention there is provided a first electrical system comprising a wind farm side voltage source converter as described hereinabove having a first end of a DC transmission link connected to the DC terminal thereof; and a grid side voltage source converter including a DC terminal to which a second end of the DC transmission link is connected and an AC terminal for connection to a main AC grid. The main controller of the wind farm side voltage source converter is configured to compare the measured DC voltage at the DC terminal of the wind farm side voltage source converter with an expected DC voltage defined by the sum of a DC voltage demand of the gird side voltage source converter received from a higher level controller and the voltage drop along the DC transmission link; and alter the active power demand of the wind farm side voltage source converter received from the higher level controller when the measured DC voltage differs from the expected DC voltage.

Such an arrangement allows the DC voltage demand of the grid side voltage source converter, i.e. as determined by a higher level controller such as a dispatch centre, to control the active power output of the wind farm side voltage source converter (e.g. so that it matches the active power demanded by the grid side voltage source converter, without the need for a separate telecommunication system).

According to a third aspect of the invention there is provided a power transmission network comprising a plurality of parallel-connected wind farm side voltage source converters as described hereinabove, and/or a plurality of parallel-connected first electrical systems as described hereinabove.

Such a power transmission network allows a large wind farm, i.e. a wind farm which includes a high number of wind turbines such that the maximum potential power output of all of the wind turbines is much greater than the power a single wind farm side voltage source converter can handle, to feed a respective plurality of wind farm side voltage source converters and have them share the power output between themselves according to their individual capabilities, while at the same time maintaining the overall stability of the power transmission network.

Moreover, since each wind farm side voltage source converter has a main controller which includes a power-frequency slope sub-controller and which is configured to apply an artificial inertia to the frequency resulting from the said sub-controller, the or each remaining wind farm side voltage source converter in the power transmission network can easily, i.e. without the need for a complex additional control system, continue to be frequency controlled by its associated main controller in the event that, e.g. one or more of the wind farm side voltage source converters experiences and outage and goes offline.

In another wind farm side voltage source converter according to a further embodiment of the invention the main controller is configured to modify an active power demand of the voltage source converter in response to a measured DC voltage at the DC terminal by comparing the measured DC voltage with a predetermined DC over-voltage value and reducing the active power demand when the measured DC voltage is greater than or equal to the DC over-voltage value.

Such a main controller assists the wind farm side voltage source converter to reduce the active power it outputs, e.g. and thereafter in use transmits to a grid side voltage source converter via an associated DC transmission link, in response to a change in the DC voltage presented at the DC terminal of the wind farm side voltage source converter. Such a change in the DC voltage may be occasioned by a fault in another part of the power transmission network in which the wind farm side voltage source converter is in use located, and so the foregoing arrangement permits the wind farm side voltage source converter to react to the fault without the need for a separate telecommunications system between the wind farm side voltage source converter and the other part of the power transmission network.

According to a fourth aspect of the invention there is provided a second electrical system comprising a wind farm side voltage source converter as described hereinabove having a first end of a DC transmission link connected to the DC terminal thereof; and a grid side voltage source converter including a DC terminal to which a second end of the DC transmission link is connected, an AC terminal for connection to a main AC grid, and a second main controller configured to detect an increase in the frequency at which the grid side voltage source converter is operating and thereafter increase the DC voltage at the DC terminal of the grid side voltage source converter to the predetermined over-voltage value.

The frequency at which the grid side voltage source converter operates will, in use, have a tendency to increase in the event of a fault in the main AC grid which gives rise to an islanding of the second electrical system, i.e. a separation of the second electrical system from the main AC grid, e.g. by the tripping of a remote breaker elsewhere in the main AC grid. As a result, the inclusion of a second main controller which is able to increase the DC voltage at the DC terminal of the grid side voltage source converter to the predetermined over-voltage value in response to such an increase in the operating frequency of the grid side voltage source converter, provides the option of selectively reducing the active power flowing through the DC transmission medium from the wind farm side voltage source converter to the grid side voltage source converter, and at the same time provides the option of controlling the increase in the frequency at which the grid side voltage source converter is operating to within a safe limit.

In addition, such functionality and the protection of both the grid side voltage source converter and the wind farm side voltage source converter are provided without the need for a separate telecommunication system between, e.g. the remote breaker and one or both of the wind farm side voltage source converter and the grid side voltage source converter.

BRIEF DESCRIPTION OF THE DRAWINGS

There now follows a brief description of embodiments of the invention, by way of non-limiting examples, with reference being made to the accompanying drawings in which.

DETAILED DESCRIPTION

A wind farm side voltage source converter according to a first embodiment of the invention includes a DC terminal, which in use is connected to a DC transmission link (i.e. an overhead line or an under-sea cable), an AC terminal, which in use is connected to a wind farm, and a first main controller.

Figure 1:
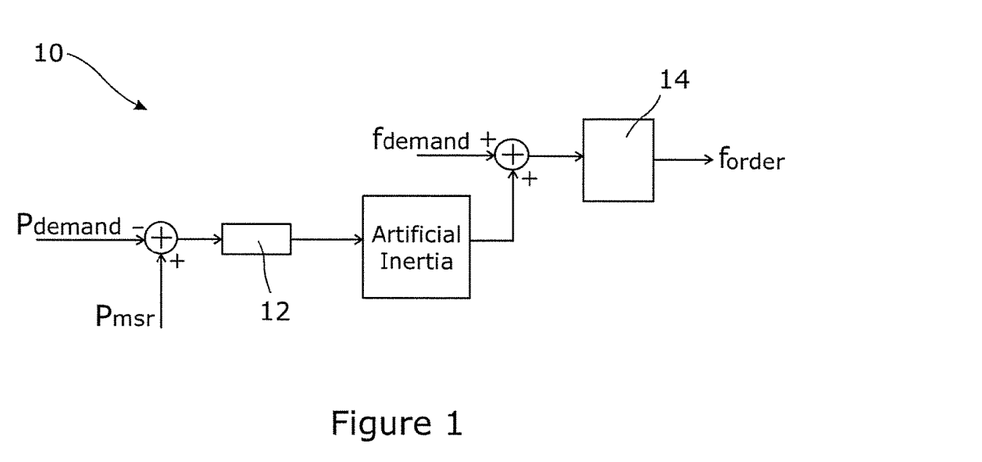
FIG. 1 shows a first main controller of a wind farm side voltage source converter according to a first embodiment of the invention.

The first main controller 10 is shown schematically in FIG. 1 and is configured to modify an active power demand $P_{demand}$ of the first wind farm side voltage source converter of which the first main controller 10 forms a part. The active power demand $P_{demand}$, i.e. the active power that the first wind farm side voltage source converter is required to provide, is provided by a higher level controller (not shown) such as, for example, a dispatch centre.

The first main controller 10 is configured to modify the active power demand $P_{demand}$ by introducing an artificial inertia factor.

More particularly, the first main controller 10 includes a power-frequency slope sub-controller 12 and is configured to pass the active power demand $P_{demand}$ through the power-frequency slope sub-controller 12 in order to transform the associated active power value into a frequency value.

Before passing the active power demand $P_{demand}$ to the power-frequency slope sub-controller 12 the first main controller 10 subtracts the active power demand $P_{demand}$ from an active power value $P_{msr}$ measured at a point of common coupling between the first wind farm side voltage source converter and the wind farm to which it is in use connected.

As the active power demand $P_{demand}$ passes through the power-frequency slope sub-controller 12 the power-frequency slope sub-controller 12 applies the artificial inertia factor, which takes the form of a lagging function. In an embodiment of the invention the lagging function is defined by:

$$\frac{1}{1+sT}$$

where s is the angular frequency of the associated AC system, i.e. an associated wind farm 44; and T is a time constant.

In other embodiments of the invention the artificial inertia factor may take a different form and/or may be defined by a different function which nevertheless similarly mimics the effect of mechanical inertia.

The frequency value resulting from the power-frequency slope sub-controller 12, i.e. the frequency value output by the power-frequency slope sub-controller 12 and incorporating the artificial inertia factor, is added to a frequency demand $f_{demand}$. This frequency demand $f_{demand}$, i.e. the frequency at which the first wind farm side voltage source converter is required to operate, is provided by the same higher level controller as that which provides the active power demand $P_{demand}$.

The sum of the frequency resulting from the power-frequency slope sub-controller 12 and the frequency demand $f_{demand}$ is passed through a frequency limiter 14, which prevents the summed frequency value exceeding predefined safe operating limits of the first wind farm side voltage source converter, before being output as a frequency order $f_{order}$ which controls the actual frequency at which the first wind farm side voltage source converter is intended to operate.

In the foregoing manner the first main controller 10 acts as a frequency controller with the control loop embodied therein being altered by a power demand error, i.e. the difference between the active power demand $P_{demand}$ and the measured active power $P_{msr}$.

More particularly, the first main controller 10 helps to ensure that the frequency at which the first wind farm side voltage source converter is controlled to operate, i.e. $f_{order}$, drops when the measured active power $P_{msr}$ is lower than the active power demand $P_{demand}$, and the operating frequency $f_{order}$ increases when the measured active power $P_{msr}$ is higher than the active power demand $P_{demand}$. In use a fall in the operating frequency $f_{order}$ causes the power angle, i.e. the angle between the wind farm voltage vector and the first wind farm side voltage source converter voltage vector, to increase, while an increase in the operating frequency $f_{order}$ causes the power angle to decrease. Such a phenomenon is useful in circumstances where a plurality of first wind farm side voltage source converters are connected in parallel and it is desired to have them share the power output of an associated wind farm differently according to their own individual capabilities since a change in the power angle of one voltage source converter relative to another least also to a change in the active power flowing through one voltage source converter compared to the other, as is described hereinbelow in connection with another embodiment of the invention.

Meanwhile, in use the introduction of an artificial inertia factor helps to dampen the aforesaid changes in the frequency $f_{order}$ that the first wind farm side voltage source converter is controlled to operate at so as to maintain the stability of the said voltage source converter.

A wind farm side voltage source converter according to a second embodiment of the invention is similar to the first wind farm side voltage converter described above and like features share the same reference numerals. The second wind farm side voltage source converter also includes a DC terminal, which in use is connected to a DC transmission link, and an AC terminal which in use is connected to a wind farm.

Figure 2:
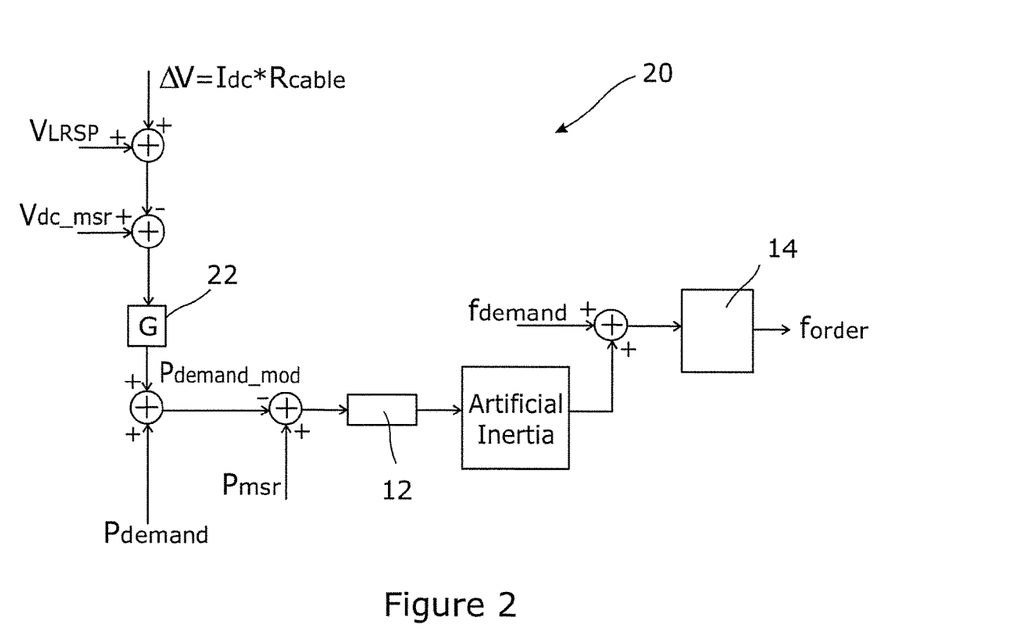
FIG. 2 shows a second main controller of a wind farm side voltage source converter according to a second embodiment of the invention.

However, the second wind farm side voltage source converter includes a second main controller 20 which, while similar in some respects to the first main controller 10, additionally includes some differences.

The second main controller 20 is similarly configured to modify an active power demand $P_{demand}$ of the second wind farm side voltage source converter (which is again provided by a higher level controller) by introducing an artificial inertia factor.

However, the second main controller 20 is configured to additionally modify the active power demand $P_{demand}$ in response to a measured DC voltage $V_{dc\_msr}$ at the DC terminal of the second wind farm side voltage source converter, i.e. as shown in FIG. 2.

The second main controller 20 carries out such modification by comparing the measured DC voltage $V_{dc\_msr}$ with an expected DC voltage and altering the active power demand $P_{demand}$ when the measured DC voltage $V_{dc\_msr}$ differs from the expected DC voltage to thereby produce a modified active power demand $P_{demand\_mod}$.

The expected DC voltage is based on a DC voltage demand which is provided by the same higher level control that provides the active power demand $P_{demand}$ for the second wind farm side voltage source converter. The DC voltage demand may also be known as a Load Reference Set Point (LRSP) which is a target DC voltage that all gird side voltage source converters connected to a main grid are aimed to operate at.

A DC voltage order $V_{dc\_order}$ that a gird side voltage source converter, which is the subject of the DC voltage demand LRSP provided by the higher level controller, should be controlled to operate at can be derived at zero DC current according to the following relationship:

$$V_{dc_{order}} = LRSP + \left(\frac{P_{demand}grid_{side}}{LRSP}\right)Droop$$

As a result the DC voltage order $V_{dc\_order}$ will equal the DC voltage demand $V_{LRSP}$ received from the higher level controller when the active power received by the grid side voltage source converter is at the same level as the active power demand $P_{demand\_grid\_side}$ instruction it has received from the higher level controller. Thus, if the actual active power received by the grid side voltage source converter is different from its active power demand $P_{demand\_grid\_side}$ then the actual DC voltage at which the grid side voltage source converter is operating will likewise differ from the DC voltage demand $V_{LRSP}$.

As a result the voltage level of a DC transmission link which in use connects the second wind farm side voltage source converter with a grid side voltage source converter that is the subject of the DC voltage demand $V_{LRSP}$ provided by the higher level controller, will also differ from the DC voltage demand $V_{LRSP}$.

The voltage level of the DC transmission link manifests itself as a measured DC voltage $V_{dc\_msr}$ at the second wind farm side voltage source converter, and so any difference between the voltage level of the DC transmission link and the DC voltage demand $V_{LRSP}$ is detectable by the second main controller 20 of the second wind farm side voltage source converter.

In adopting the foregoing approach it is necessary to account for a voltage drop $\Delta V$ along the DC transmission link, and so the expected DC voltage is given by the sum of the DC voltage demand $V_{LRSP}$ and the said voltage drop $\Delta V$ along the DC transmission link which may be given by:

$$\Delta V = I_{dc} \times R_{cable}$$

where
a. $I_{dc}$ is the level of DC current flowing through the DC transmission link; and
b. $R_{cable}$ is the resistance of the DC transmission link.

Accordingly, in order to produce a modified active power demand $P_{demand\_mod}$ the second main controller 20 sums the DC voltage demand $V_{LRSP}$ and the voltage drop $\Delta V$ along the DC transmission link and then subtracts this from the measured DC voltage $V_{dc\_msr}$ at the DC terminal of the second wind farm side voltage source converter.

In an embodiment, the output of this manipulation is then amplified by multiplying it by a gain factor 22 before being summed with the active power demand $P_{demand}$ received from the higher level controller to give the desired modified active power demand $P_{demand\_mod}$ value.

Thereafter operation of the second main controller 20 and the manner in which it introduces an artificial inertia factor is similar to the manner in which the first main controller 10 achieves such a step.

The second main controller subtracts the modified active power demand $P_{demand\_mod}$ from an active power value $P_{msr}$ measured at the point of common coupling between the second wind farm side voltage source converter and the wind farm to which it is in use connected, and then applies an artificial inertia factor in the form of a lagging function as the altered modified active power demand $P_{demand\_mod}$ passes through a power-frequency slope sub-controller 12. The frequency value resulting from the power-frequency slope sub-controller 12 is again then added to a frequency demand $f_{demand}$ provided by the higher level controller, and the sum of the frequency resulting from the power-frequency slope sub-controller 12 and the frequency demand $f_{demand}$ is passed through a frequency limiter 14 before being output as a frequency order $f_{order}$ which controls the frequency at which the second wind farm side voltage source converter is intended to operate.

In use the second main controller 20 is therefore able to detect changes in the voltage level of a DC transmission link to which it is connected and thereafter automatically modify the active power demand $P_{demand}$ it receives from a higher level controller so that it can become aligned with, e.g. the active power $P_{demand\_grid\_side}$ demanded of a grid side voltage source converter connected to the other end of the DC transmission link.

Figure 3:
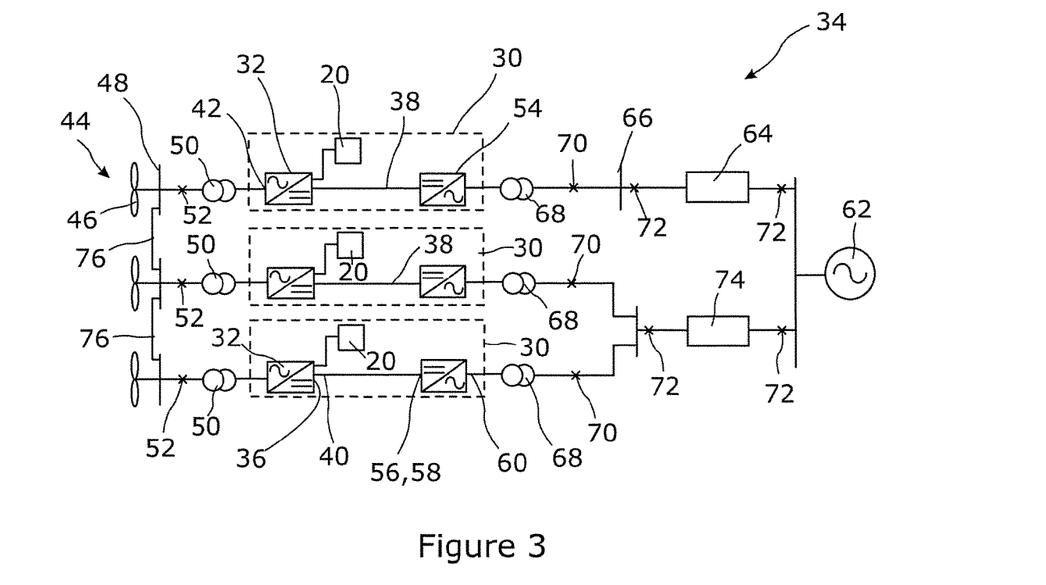
FIG. 3 shows respective first electrical systems and an associated power transmission network according to embodiments of the invention.

The second wind farm side voltage source converter desirably forms a part of a first electrical system 30 within which it is identified by reference numeral 32. The first electrical system 30 may itself form a part of a power transmission network 34 that includes a plurality of the first electrical systems 30 connected in parallel with one another, as shown in FIG. 3. Each of the first electrical systems 30 and the power transmission network 34 is an embodiment of the invention.

Each first electrical system 30 includes a said second wind farm side voltage source converter 32 which has a first end 36 of a DC transmission link 38 connected to the DC terminal 40 thereof. Each second wind farm side voltage source converter 32 also includes an AC terminal 42 which is, in use, connected to a corresponding wind farm 44 that includes at least one wind turbine 46. The second wind farm side voltage source converter 32 may be connected to the wind farm 44 via a first point of common coupling 48 and a first transformer 50. A first circuit breaker 52 may also lie between the first point of common coupling 48 and the first transformer 50, although this need not necessarily be the case.

Each first electrical system 30 also includes a first grid side voltage source converter 54 which has a further DC terminal to which a second end 58 of the DC transmission link 38 is connected. The first grid side voltage source converter 54 also includes an AC terminal 60 which, in use, is connected to a main AC grid 62.

More particularly, in the example shown, the first grid side voltage source converter 54 in one of the first electrical systems 30 may be connected with the main AC grid 62 via a first overhead line 64 which extends from a second point of common coupling 66. In such an arrangement a second transformer 68 and a second circuit breaker 70 may lie between the second point of common coupling 66 and the first grid side voltage source converter 54. Further remote circuit breakers 72 may lie towards either end of the first transmission line 64.

A pair (or more) of first electrical systems 30 may also be connected with the main AC grid via a single, shared second overhead line 74 which similarly extends from a second point of common coupling 66. In an embodiment, a second transformer 68 and a second circuit breaker 70 lie between the second point of common coupling 66 and the first grid side voltage source converter 54 of each of the pair of first electrical systems 30. Further remote circuit breakers similarly may lie towards either end of the second overhead line 74.

In other embodiments of the invention (not shown) the or each overhead line 64, 74 may be replaced by a different transmission medium such as, for example, a cable (undersea or otherwise), several overhead lines, several cables, or some combination thereof.

As described hereinabove, each second wind farm side voltage source converter 32 includes a second main controller 20 which is configured to compare the measured DC voltage $V_{dc\_msr}$ at the DC terminal 40 of the corresponding second wind farm side voltage source converter 32 with an expected DC voltage that is defined by the sum of a DC voltage demand $V_{LRSP}$ of the first grid side voltage source converter 54 (i.e. as received from a higher level controller) and the voltage drop $\Delta V$ along the DC transmission link 38. Each second main controller 20 is still further configured to alter the active power demand $P_{demand}$ of the corresponding second wind farm side voltage source converter 32 (i.e. as received from the higher level controller) when the measured DC voltage $V_{dc\_msr}$ differs from the expected DC voltage.

In this way the second wind farm side voltage source converter 32 within each first electrical system 30 automatically modifies the active power demand $P_{demand}$ it receives from the higher level controller so that the active power it transfers is aligned with the active power $P_{demand\_grid\_side}$ demanded by the first grid side voltage source converter 54 to which it is connected by the corresponding DC transmission link 38.

It follows that in each first electrical system 30 the first grid side voltage source converter 54 controls the flow of active power through the DC transmission link 38, rather than the corresponding second wind farm side voltage source converter 32 affecting such control. As a result each first grid side voltage source converter 54 is considered to be a master converter, while each second wind farm side voltage source converter 32 acts as a slave converter.

Adjacent wind farms 44 in the power transmission network 34 described above are connected to one another by a respective AC link 76 which may be an under-sea cable or an overhead line.

If the impedance of each AC link 76 is sufficiently high then each second wind farm side voltage source converter 32 is able independently to control the AC voltage at which it operates.

Figure 4:
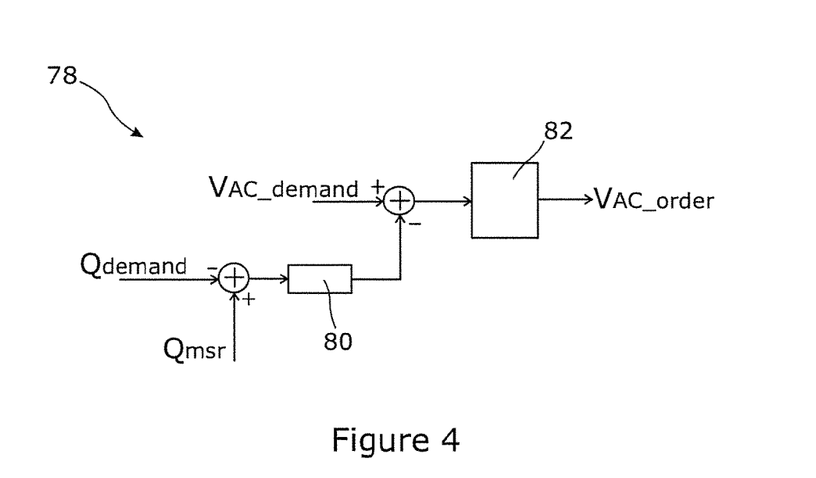
FIG. 4 shows an AC voltage-reactive power droop sub-controller.

However, if the impedance of each AC link 76 is very small then each second main controller 20 may additionally include an AC voltage-reactive power droop sub-controller 78, as shown in FIG. 4, so that the AC voltage at which each second wind farm side voltage source converter 32 operates can be controlled jointly by the various second main controllers 20.

As illustrated schematically in FIG. 4, each AC voltage-reactive power droop sub-controller 78 subtracts an AC reactive power demand $Q_{demand}$ (which it receives from a higher level controller) from a measured AC reactive power $Q_{msr}$ (which is taken at the corresponding first point of common coupling 48) and passes the result through a reactive power-voltage slope sub-controller 80 that converts the result into a voltage.

The resulting voltage is in turn subtracted from a demanded AC voltage magnitude $V_{AC\_demand}$ provided by the higher level controller, before being passed through a voltage limiter 82 which prevents the further resulting voltage value from exceeding predefined safe operating limits of the second wind farm side voltage source converter 32. The output voltage value $V_{AC\_order}$ from the voltage-reactive power droop sub-controller 78 is the AC voltage level at which the corresponding second wind farm side voltage source converter 32 is controlled to operate at.

A wind farm side voltage source converter according to a third embodiment of the invention is similar to each of the first and second wind farm side voltage source converters described hereinabove.

Figure 5:
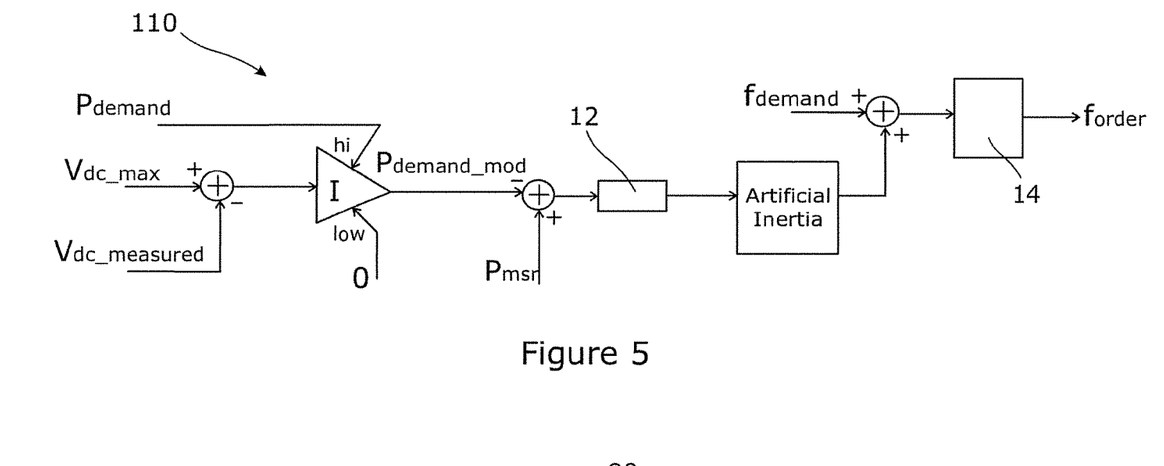
FIG. 5 shows a third main controller of a wind farm side voltage source converter according to a third embodiment of the invention.

In this regard the third wind farm side voltage source converter includes a third main controller 110 which introduces an artificial inertia factor in a similar manner to the second main controller 20, i.e. by subtracting a modified active power demand $P_{demand\_mod}$ from an active power value $P_{msr}$ measured at the point of common coupling between the third wind farm side voltage source converter and the wind farm to which it is in use connected, and then by applying an artificial inertia factor in the form of a lagging function as the altered active power demand $P_{demand\_mod}$ passes through a power-frequency slope sub-controller 12. The frequency value resulting from the power-frequency slope sub-controller is again then added to a frequency demand $f_{demand}$ provided by a higher level controller, and the sum of the frequency resulting from the power-frequency slope sub-controller 12 and the frequency demand $f_{demand}$ is passed through a frequency limiter 14 before being output as a frequency order $f_{order}$ which controls the frequency at which the third wind farm side voltage source converter is intended to operate.

However the third main controller produces the modified active power demand $P_{demand\_mod}$ in a different way to the second main controller 20, as is illustrated schematically in FIG. 5.

More particularly, the third main controller is configured to compare a measured DC voltage $V_{dc\_msr}$, i.e. as measured at the DC terminal of the third wind farm side voltage source converter, with a predetermined DC over-voltage value which, in the embodiment shown, equates to a maximum acceptable limit $V_{dc\_max}$ in terms of the operational safety of a grid side voltage source converter to which the third wind farm side voltage source converter is, in use, connected.

In the embodiment shown, when the measured DC voltage $V_{dc\_msr}$ equals the predetermined DC over-voltage value $V_{dc\_max}$ the third main controller 110 reduces the active power demand $P_{demand}$ received from the higher level controller to a lower modified active power demand $P_{demand\_mod}$ (which it then subtracts from the active power value measured at the first point of common coupling between the third wind farm side voltage source converter and the wind farm to which it is in use connected, before applying the artificial inertia factor). In other embodiments, however, the third main controller 110 may reduce the active power demand $P_{demand}$ received from the higher level controller to a lower modified active power demand $P_{demand\_mod}$ when the measured DC voltage $V_{dc\_msr}$ exceeds the predetermined DC over-voltage value $V_{dc\_max}$.

In use the third wind farm side voltage source converter is therefore, via operation of the third main controller therein, able to reduce the active power it transfers, e.g. to a grid side voltage source converter to which it is connected in use via an associated DC transmission link, in response to a change in the DC voltage presented at its DC terminal, e.g. as may be occasioned by a fault in another part of the power transmission network in which the third wind farm side voltage source converter is in use located.

Figure 6:
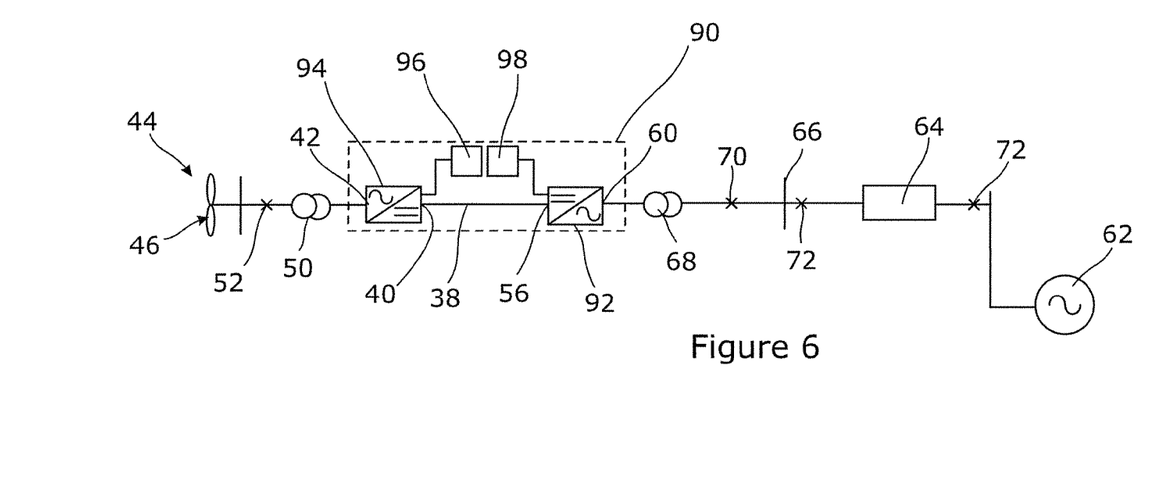
FIG. 6 shows a second electrical system according to an embodiment of the invention.

In this regard the third wind farm side voltage source converter cooperates with a second grid side voltage source converter 92 in the form of a second electrical system 90 according to another embodiment of the invention which is shown schematically in FIG. 6.

The third wind farm side voltage source converter 94 shown in FIG. 6 is identical to the third wind farm side voltage source converter described above, and likewise includes a third main controller 96 which is configured to operate in exactly the same way as the third main controller described above. As additionally illustrated in FIG. 6, the third wind farm side voltage source converter 94 has a first end 36 of a DC transmission link 38 connected to its DC terminal 40.

As mentioned above, the second electrical assembly 90 also includes a second grid side voltage source converter 92 which itself has a DC terminal 56 that is connected with a second end 58 of the DC transmission link 38, and also an AC terminal 60 which in use may be connected to a main AC grid 62. The AC terminal 60 of the second grid side voltage source converter 92 may be connected to the main AC grid 62 via a first overhead line 64 which extends from a second point of common coupling 66. In such an arrangement a second transformer 68 and a second circuit breaker 70 may lie between the second point of common coupling 66 and the second grid side voltage source converter 92. Further remote circuit breakers 72 may lie towards either end of the first overhead line 64.

Figure 7:
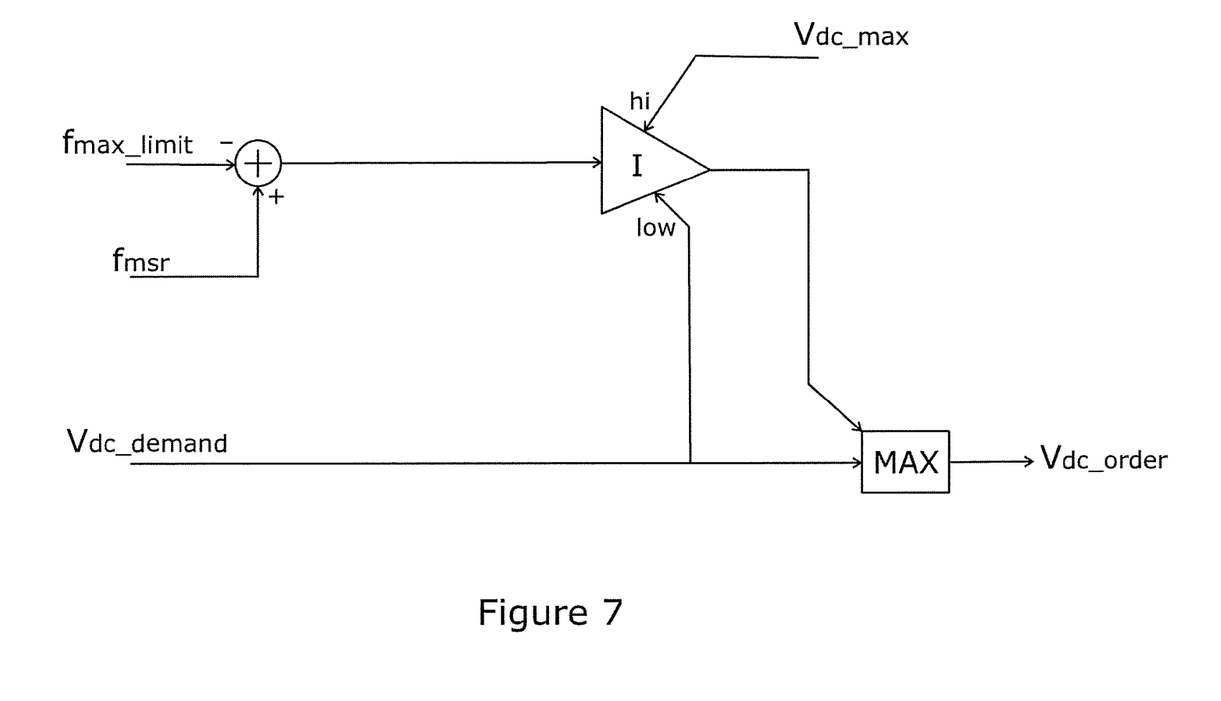
FIG. 7 shows a main controller of a grid side voltage source converter which forms a part of the second electrical system shown in FIG. 6.

The second grid side voltage source converter 92 includes a fourth main controller 98 which, as illustrated schematically in FIG. 7, is configured to detect an increase in the frequency at which the second grid side voltage source converter 92 is operating and thereafter increase the DC voltage at the DC terminal 56 of the second grid side voltage source converter 92 to a predetermined over-voltage value, i.e. a maximum acceptable limit $V_{dc\_max}$ which continues to ensure the operational safety of the second grid side voltage source converter 92.

More particularly the fourth main controller 98 detects an increase in the frequency at which the second grid side voltage source converter 92 is operating by measuring the frequency $f_{msr}$ at the second point of common coupling 66 of the second grid side voltage source converter 92 and subtracting from this measured frequency $f_{msr}$ a maximum safe limit $f_{max\_limit}$ of the frequency at the said second point of common coupling 66.

Thereafter, if the measured frequency $f_{msr}$ is greater than the maximum safe frequency $f_{max\_limit}$ the fourth main controller 98 changes the demanded DC voltage $V_{dc\_demand}$ of the second grid side voltage source converter 92 (i.e. as received from a higher level controller) to a DC voltage level $V_{dc\_order}$ at which the second grid side voltage source converter 92 is intended to operate that is equal to the predetermined over-voltage value, i.e. $V_{dc\_max}$ in order to maintain the frequency of the second grid side voltage source converter 92 at the said maximum safe frequency $f_{max\_limit}$. This in turn results in the voltage level at the DC terminal 56 of the second grid side voltage source converter 92, and hence (via the DC transmission link 38) the voltage level at the DC terminal 40 of the third wind farm side voltage source converter 94, increasing to the predetermined over-voltage value, i.e. $V_{dc\_max}$.

Such an increase in the voltage level at the DC terminal 40 of the third wind farm side voltage source converter 94 is detected by the third main controller 96 of the third wind farm side voltage source converter 94, such that it is then able automatically to reduce the active power it transfers to the second grid side voltage source converter 92 through the associated DC transmission link 38.

For example, if the remote circuit breaker 72 closest to the main AC grid 62 trips due to an AC fault in the main AC grid 62, then the frequency at the AC terminal 60 of the second grid side voltage source converter 92 will start to increase due to the separation of the third wind farm side voltage source converter 94 and its associated wind farm, together with the second grid side voltage source converter 92, from the main AC grid 62.

However, the fourth main controller 98 of the second grid side voltage source converter 92 is able to maintain the frequency at an emergency level, i.e. at a maximum safe frequency $f_{max\_limit}$ level, very close to the nominal operating frequency level (e.g. 52 Hz for a 50 Hz system) by increasing the DC voltage of the second grid side voltage source converter 92 to the predetermined over-voltage value, i.e. $V_{dc\_max}$ (e.g. 1.1 pu).

At the same time the third main controller 96 of the third wind farm side voltage source converter 94 automatically reduces the active power $P_{demand}$ demanded of it, and thereby reduces the active power it transfers to the second grid side voltage source converter 92, when it detects the increase in voltage at its DC terminal 40 that is occasioned by the aforementioned increase in the DC voltage of the second grid side voltage source converter 92.

As a result the second electrical system 90, and the cooperation of the third wind farm side voltage source converter 94 and second grid side voltage source converter 92 included therein, results in a reduction, or even cessation, of the active power flowing through the DC transmission link 38 such that the operating frequency of second grid side voltage source converter 92 (which is now separated from the main AC grid 62, i.e. is now islanded from the main AC grid 62) is kept to the maximum safe limit $f_{max\_limit}$ while at the same time the voltage level at the DC terminal 56 of the second grid side voltage source converter 92, and hence also the voltage level in the DC transmission link 38, does not exceed a maximum acceptable level, i.e. the predetermined over-voltage value $V_{dc\_max}$.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A wind farm side voltage source converter comprising:
   a DC terminal for connection to a DC transmission link;
   an AC terminal for connection to a wind farm including at least one wind turbine; and
   a main controller including a power-frequency slope sub-controller, the main controller configured to modify an active power demand of the voltage source converter received from a higher level controller by passing the active power demand through the power-frequency slope sub-controller and thereafter applying an artificial inertia factor to a resulting frequency.

2. The wind farm side voltage source converter according to claim 1 wherein the power-frequency slope sub-controller is configured itself to apply the artificial inertia factor.

3. The wind farm side voltage source converter according to claim 1 wherein the artificial inertia factor takes the form of a lagging function.

4. The wind farm side voltage source converter according to claim 1 wherein the main controller is configured to modify the active power demand of the voltage source converter received from a higher level controller in response to a measured DC voltage at the DC terminal by comparing the measured DC voltage with an expected DC voltage based on a DC voltage demand received from a higher level controller and altering the active power demand when the measured DC voltage differs from the expected DC voltage.

5. The wind farm side voltage source converter according to claim 4 wherein the altered active power demand is passed through the power-frequency slope sub-controller before an artificial inertia factor is applied to the resulting frequency.

6. A first electrical system comprising:
   the wind farm side voltage source converter according to claim 4 having a first end of the DC transmission link connected to the DC terminal thereof; and
   a grid side voltage source converter including a DC terminal to which a second end of the DC transmission link is connected and an AC terminal for connection to a main AC grid, the main controller of the wind farm side voltage source converter being configured to:
   compare the measured DC voltage at the DC terminal of the wind farm side voltage source converter with an expected DC voltage defined by the sum of a DC voltage demand of the grid side voltage source converter received from a higher level controller and the voltage drop along the DC transmission link; and
   alter the active power demand of the wind farm side voltage source converter received from the higher level controller when the measured DC voltage differs from the expected DC voltage.

7. A power transmission network comprising a plurality of parallel-connected wind farm side voltage source converters, each of the wind farm side voltage source converters according to claim 1.

8. The wind farm side voltage source converter according to claim 1 wherein the main controller is configured to modify an active power demand of the voltage source converter in response to a measured DC voltage at the DC terminal by comparing the measured DC voltage with a predetermined DC over-voltage value and reducing the active power demand when the measured DC voltage is greater than or equal to the DC over-voltage value.

9. A second electrical system comprising:
   the wind farm side voltage source converter according to claim 8 having a first end of the DC transmission link connected to the DC terminal thereof; and
   a grid side voltage source converter including a DC terminal to which a second end of the DC transmission link is connected, an AC terminal for connection to a main AC grid, and a second main controller configured to detect an increase in a frequency at which the grid side voltage source converter is operating and thereafter increase the DC voltage at the DC terminal of the grid side voltage source converter to the predetermined DC over-voltage value.

10. The wind farm side voltage source converter according to claim 2 wherein the artificial inertia factor takes the form of a lagging function.

11. A first electrical system comprising:
    the wind farm side voltage source converter according to claim 5 having a first end of the DC transmission link connected to the DC terminal thereof; and
    a grid side voltage source converter including a DC terminal to which a second end of the DC transmission link is connected and an AC terminal for connection to a main AC grid,
    the main controller of the wind farm side voltage source converter being configured to:
    compare the measured DC voltage at the DC terminal of the wind farm side voltage source converter with an expected DC voltage defined by the sum of a DC voltage demand of the grid side voltage source converter received from a higher level controller and the voltage drop along the DC transmission link; and
    alter the active power demand of the wind farm side voltage source converter received from the higher level controller when the measured DC voltage differs from the expected DC voltage.

12. A power transmission network comprising a plurality of parallel-connected first electrical systems, each of the first electrical systems according to claim 11.

* * * * *